United States Patent
Kim et al.

(10) Patent No.: US 8,576,277 B2
(45) Date of Patent: Nov. 5, 2013

(54) 3-D DISPLAY DEVICE AND DISPLAY METHOD THEREOF

(75) Inventors: Joo-Young Kim, Suwon-si (KR); Cheol-Wo Park, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 516 days.

(21) Appl. No.: 12/844,592

(22) Filed: Jul. 27, 2010

(65) Prior Publication Data
US 2011/0096156 A1  Apr. 28, 2011

(30) Foreign Application Priority Data
Oct. 28, 2009 (KR) .................. 10-2009-0102981

(51) Int. Cl.
*H04N 13/04* (2006.01)
(52) U.S. Cl.
USPC .................. 348/59; 348/42; 348/51
(58) Field of Classification Search
None
See application file for complete search history.

(56) References Cited

U.S. PATENT DOCUMENTS

| | | | |
|---|---|---|---|
| 6,075,556 A * | 6/2000 | Urano et al. | 348/43 |
| 2003/0206653 A1* | 11/2003 | Katayama et al. | 382/154 |
| 2005/0117637 A1* | 6/2005 | Routhier et al. | 375/240.01 |
| 2006/0061592 A1* | 3/2006 | Akenine-Moller et al. | 345/611 |
| 2007/0177262 A1* | 8/2007 | Maekawa et al. | 359/457 |
| 2008/0158344 A1* | 7/2008 | Schechterman et al. | 348/46 |
| 2008/0253777 A1* | 10/2008 | Delve et al. | 398/208 |
| 2008/0316596 A1* | 12/2008 | Cha et al. | 359/463 |
| 2009/0080771 A1* | 3/2009 | Kamon et al. | 382/166 |
| 2011/0280479 A1* | 11/2011 | Yamada et al. | 382/167 |

* cited by examiner

*Primary Examiner* — Joseph Ustaris
*Assistant Examiner* — Jill Sechser
(74) *Attorney, Agent, or Firm* — F. Chau & Associates, LLC

(57) ABSTRACT

A display device capable of displaying a stereoscopic image has improved display quality when displaying a 2-D image by filtering to include image data from surrounding pixels in output data corresponding to a specific pixel based on weight values. The data of the specific pixel is influenced by the surrounding pixels, to display the data of the specific pixel in a wider range. As a result, non-recognition of a thin line or character at an arbitrary angle may be prevented.

32 Claims, 6 Drawing Sheets

FIG.7

| β | β | β |
|---|---|---|
| β | α | β |
| β | β | β |

FIG.8

| γ | β | γ |
|---|---|---|
| β | α | β |
| γ | β | γ |

3-D DISPLAY DEVICE AND DISPLAY METHOD THEREOF

CROSS-REFERENCE TO RELATED APPLICATION

This application claims priority under 35 U.S.C. §119 from Korean Patent Application No. 10-2009-0102981 filed in the Korean Intellectual Property Office on Oct. 28, 2009, the entire contents of which are herein incorporated by reference in their entirety.

BACKGROUND OF THE INVENTION (a) Field of the Invention

The present disclosure is directed to a stereoscopic image display device and a method of displaying a 2-D image in the stereoscopic image display device.

(b) Description of the Related Art

Fast communication services to be provided by the information superhighway are expected to evolve from simpler services for hearing and speaking, such as current telephone services, to audible and visible multimedia services utilizing digital terminals for quickly processing characters, voices, and images. Furthermore, 3-D communication services that enable realistic and stereoscopic viewing and hearing are eventually expected to be developed, overcoming current temporal and spatial limitations.

Typically, a 3-D image is perceived by means of stereo vision of two eyes. Binocular disparity, i.e., a disparity caused by two eyes being separated by a distance of about 65 mm, plays a most important role in the stereoscopic effect. That is, when left and right eyes view different 2-D images and the two images are transmitted to the brain through the optic nerves, the brain combines the two images to construct a representation of the original 3-D image that includes depth. Such ability is usually called stereography.

Schemes using binocular disparity for 3-D image displays are typically categorized, depending on a need for eyeglasses, as stereoscopic schemes, which include polarization schemes and time divisional schemes, and autostereoscopic schemes, which include parallax barrier schemes and lenticular schemes.

In a stereoscopic scheme, people may perceive a 3-D image if polarization eyeglasses or liquid crystal shutter eyeglasses are worn. However, due to the drawback of wearing polarization or liquid crystal shutter eyeglasses, stereoscopic schemes are not typically used to perceive stereoscopic images, and are typically only used in movie theatres.

In contrast, autostereoscopic schemes do not require additional eyeglasses to be worn when viewing a stereoscopic image. In particular, an autostereoscopic scheme using a lenticular lens has been found to provide the best combination of thickness and aperture ratio for a stereoscopic image display device.

A display device using a lenticular lens may be relatively thin, and the display device need not be covered by the lenticular lens. However, use of a lenticular lens may deteriorate display quality of a 2-D image other than a stereoscopic image. That is, a 2-D image is refracted in the lenticular lens such that unrecognizable pixels are generated. Also, these unrecognizable pixels may display color different from the desired color, and thin lines or small characters may be spatially shifted in the display.

SUMMARY OF THE INVENTION

Embodiments of the present invention may display a 2-D image in a stereoscopic image display device using a lenticular lens.

A stereoscopic image display device according to an exemplary embodiment of the present invention includes: a display panel including pixels having subpixels representing at least three different colors and arranged in a matrix form; a lenticular lens formed on the display panel; a data driver applying a data voltage to the display panel; a signal controller controlling the data driver; and a converter that filters an image signal representing a 2-D image signal received from an external source to generate and transmit output data to the signal controller, wherein the lenticular lens has a semi-circular cylinder shape and is aligned to transmit light from at least one row pixel of the display panel.

The lenticular lens may be aligned to transmit light from three row pixels of the display panel.

The subpixels corresponding to one lenticular lens may include subpixels representing at least three different colors which form a column.

The subpixels corresponding to one lenticular lens may be grouped in a same row or a same column to define a column pixel or a row pixel, and the column or the row may include a first pixel having a sequence of red, green, and blue subpixels, a second pixel having a sequence of green, blue, and red subpixels, and a third pixel having a sequence of blue, red, and green subpixels.

The converter may include a line memory for storing the image signals for one row among the image signals, and a filtering unit for filtering the image signals stored in the line memory.

The filtering uses a 3×3 square matrix of weight values, the filter is applied to image signals stored to the line memory being sequentially moved, and the output data may be generated by multiplying the corresponding image signal by the weight values and accumulating the multiplied values.

The central weight value of the square matrix is the largest, and the surrounding weight values are the same, and the filtering may be processed for subpixels representing the same color.

The central weight value of the square matrix is the largest, and the center top, center bottom, center right, and center left weight values are the same and are different from the weight values of the upper left corner, upper right corner, lower left corner, and lower right corner t that are the same, and the filtering may be processed for the subpixels representing the same color.

The converter may be formed of a programmable IC chip.

The filtering may include in the output data weighted according to their position relative to the specific pixel.

The filter may process eight pixels surrounding the specific pixel.

The filtering may process subpixels representing the same color in the specific pixel and the surrounding pixels.

The converter may render-process image signals representing 3-D stereoscopic images received from an external source.

A protecting substrate may be formed between the display panel and the lenticular lens and a protecting film may be formed at the surface of the lenticular lens.

A method according to an exemplary embodiment of the present invention for displaying an image of a stereoscopic image display device that uses a lenticular lens includes: determining whether an input image signal received from an external source is an image signal representing a 2-D image or an image signal representing a stereoscopic image; filtering the input image signal to generate output data when the input image signal is an image signal representing a 2-D image; and outputting the output data to display an image, wherein the filtering i includes in the output data image signals corresponding to pixels surrounding a specific pixel weighted according to their position relative to the specific pixel.

The filtering may process subpixels representing the same color in the specific pixel and the surrounding pixels.

The sum of the weight values of the specific pixel and the surrounding pixels may be 1.

The filtering processes eight pixels surrounding the specific pixel.

When the input image signal is an image signal representing a stereoscopic image, the input image signal is rendered to generate the output data.

A stereoscopic image display device according to another exemplary embodiment of the present invention includes: a display panel including pixels having subpixels representing at least three different colors and arranged in a matrix form; and a converter that filters an image signal representing a 2-D image signal received from an external source to generate output data and to transmit it to the signal controller, wherein the converter includes a line memory for storing the image signals for one row among the image signals, and a filtering unit for filtering the image signals stored in the line memory; and wherein the filtering uses a 3×3 square matrix of weight values and the filter is applied to image signals stored to the line memory while being sequentially moved, and the output data is generated by multiplying the corresponding image signal by the weight values of the square matrix and accumulating the multiplied values.

The stereoscopic image display device according to another exemplary embodiment of the present invention also includes a lenticular lens disposed on the display panel, wherein the lenticular lens has a semi-circular cylinder shape and is aligned to transmit light from three rows of three pixels of the display panel, and subpixels corresponding to one lenticular lens are grouped in a same row or a same column to define a column pixel or a row pixel, and the column or the row includes a first pixel having a sequence of red, green, and blue subpixels, a second pixel having a sequence of green, blue, and red subpixels, and a third pixel having a sequence of blue, red, and green subpixels.

A stereoscopic image display device according to an exemplary embodiment of the present invention that uses a lenticular lens, can display a recognizable 2-D image through a wider region at an arbitrary angle, so that a 2-D image may be recognized at any position in a stereoscopic image display device using the lenticular lens, improving the display quality of the 2-D image.

BRIEF DESCRIPTION OF THE DRAWINGS

FIG. 7 and FIG. 8 depict examples of filters for processing a 2-D image according to other exemplary embodiments of the present invention.

DETAILED DESCRIPTION OF THE EMBODIMENTS

Figure 1:
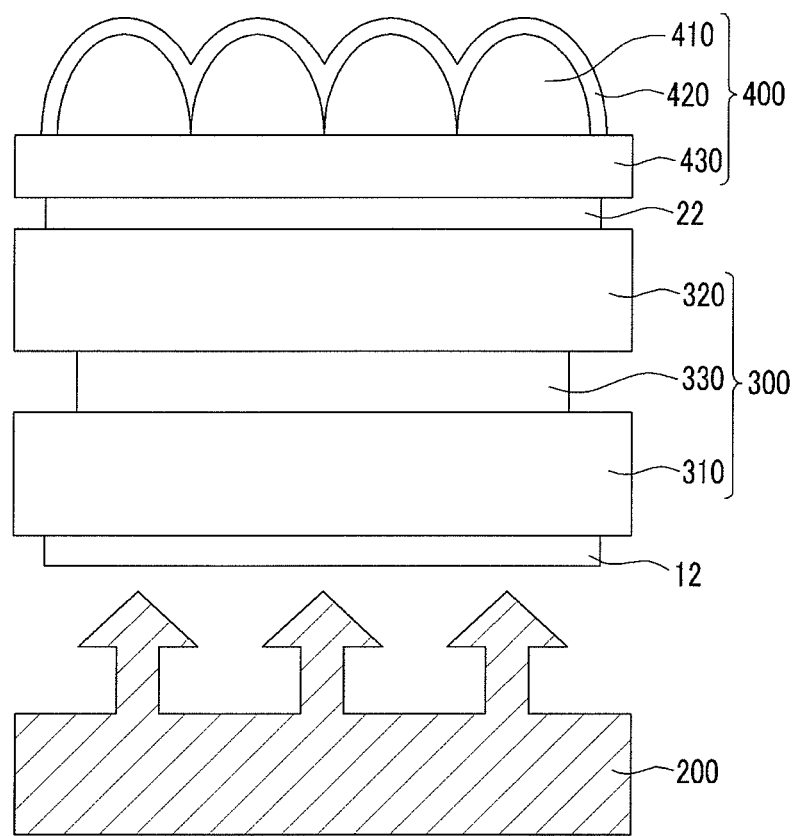
FIG. 1 is a cross-sectional view of a stereoscopic image display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, like reference numerals designate like elements throughout the specification. It will be understood that when an element such as a layer, film, region, or substrate is referred to as being "on" another element, it can be directly on the other element or intervening elements may also be present.

Now, a structure of a stereoscopic image display device according to an exemplary embodiment of the present invention will be described with reference to FIG. 1.

FIG. 1 is a cross-sectional view of a stereoscopic image display device according to an exemplary embodiment of the present invention.

As shown in FIG. 1, a stereoscopic image display device includes a display panel 300 and a lenticular unit 400, and light emitted from the display panel 300 is refracted while passing through a lenticular lens 410 such that its progressing direction is divided and is incident to two eyes to increase depth perception for the image, so that a stereoscopic image may be recognized in the stereoscopic display. Here, the light incident to the right eye and the light incident to the left eye carry different information so that a stereoscopic image may be perceived.

Various display panels may be used for a stereoscopic image display device according to different exemplary embodiments of the invention. For example, a liquid crystal panel controlling alignment direction of liquid crystals to display an image, an organic light emitting panel using an organic light emitting diode to display an image, a plasma display panel using plasma to display an image, and an electrophoretic display panel, may be used. FIG. 1 shows a representative liquid crystal panel 300 as an example. The liquid crystal panel 300, being a non-emissive device, uses a backlight unit 200 located on the rear surface of the liquid crystal panel 300 to emit light for displaying the image.

FIG. 1 schematically shows the display panel 300. That is, a lower polarizer 12 is formed at the lower surface of the display panel 300, a thin film transistor substrate 310 is formed thereon as a lower substrate, an upper substrate 320 facing thereto is formed, and a liquid crystal layer 330 is formed between the upper substrate 320 and the thin film transistor substrate 310. Also, an upper polarizer 22 is formed outside the upper substrate 320.

The thin film transistor substrate 310 includes a pixel electrode (not shown) and a thin film transistor (not shown) connected thereto to control the liquid crystal, and the alignment direction of the liquid crystal 330 changes according to a voltage applied to the pixel electrode.

On the other hand, according to an exemplary embodiment, the upper substrate 320 may include a black matrix, a color filter, and a common electrode, in which the black matrix covers a portion of the thin film transistor substrate 310 (for example the thin film transistor) that must be covered, and the common electrode along with the pixel electrode form an electric field.

The color filter is generally classified into R (red), G (green), and B (blue) filters, and colors the light passing through the liquid crystal 330 to display color images.

The display panel 300 changes the light emitted from the backlight unit 200 to have linear polarization in the lower polarizer 12, changes the phase of the light passing through the liquid crystal layer 330, and transmits the light having the same transmissive axis as that of the upper polarizer 22 to thereby display the image.

The lenticular unit 400 attached to the display panel 300 through an adhesive is formed on the display panel 300.

The lenticular unit 400 includes a lenticular lens 410, a protecting film 420 protecting the lenticular lens, and a protecting substrate 430 protecting the display panel 300.

The lenticular lens 410 is made of a material having an isotropic refractive index, and forms a semicircular cylinder attached at the upper surface of the protecting substrate 430. One lenticular lens 410 may be formed for a predetermined number of pixels in the display panel 300 according to an exemplary embodiment, and this will be described with reference to FIG. 2.

The light incident from the display panel 300 is refracted at the surface of the lenticular lens and progresses toward the left and right eyes so that a stereoscopic image may be perceived, however there is an effect that a 2-D image is also refracted. According to an embodiment of the present invention, for a 2-D image, a portion of the image displayed in each pixel is displayed at a peripheral pixel through filtering. This will be described later through FIG. 3 to FIG. 8.

First, an arrangement between the lenticular lens 410 and a pixel of the display panel 300 will be described with reference to FIG. 2.

Figure 2:
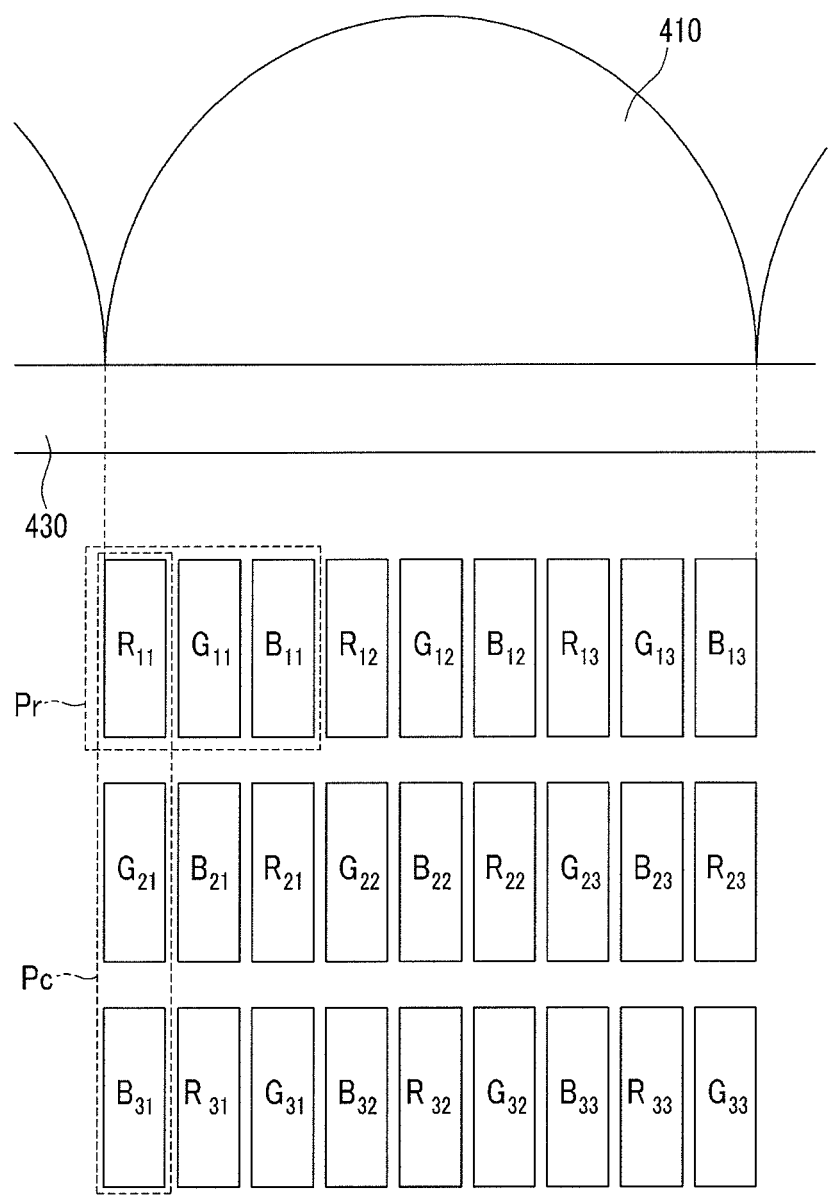
FIG. 2 is a view showing an arrangement of a lenticular lens and a pixel in a stereoscopic image display device according to an exemplary embodiment of the present invention.

FIG. 2 is a view showing an arrangement relationship of a lenticular lens and a pixel in a stereoscopic image display device according to an exemplary embodiment of the present invention.

In an exemplary embodiment of the present invention, one lenticular lens 410 is formed per nine subpixels, which is three pixels. The subpixel is a unit representing either red, green, or blue, and a pixel is a combination of three subpixels representing red, green, and blue. A position where the distance between the lenticular lens 410 and the protecting substrate 430 is shortest or where they contact each other, hereinafter referred to as an edge of the lenticular lens 410, is aligned to one side of a subpixel (or a pixel). According to an exemplary embodiment, the edge of the lenticular lens 410 may be aligned to a central position between the subpixels.

As shown in FIG. 2, in the display panel 300 according to an exemplary embodiment of the present invention, three adjacent subpixels in one row may be regarded as one pixel, hereinafter referred to as a row pixel (Pr), including red, green, and blue, and three adjacent subpixels in one column may also be regarded as one pixel, hereinafter referred to as a column pixel (Pc), having red, green, and blue. Hereafter, this arrangement is referred to as a mosaic arrangement. FIG. 2 shows only three rows, however the same arrangement is repeated in subsequent rows.

Row pixel (Pr) light is refracted and transmitted to different positions due to the lenticular lens when displaying the stereoscopic image such that the subpixel light is not grouped and recognized as one pixel. In comparison, the column pixel Pc light is refracted and transmitted in the same direction in the lenticular lens such that the subpixel light is grouped and recognized as one pixel.

In comparison, image information is input individually with respect to the row pixels Pr when displaying the 2-D image in the display panel 300, and the subpixel light is generally grouped and recognized as one pixel.

Therefore, in a present exemplary embodiment, the relationship of the column pixels Pc is more important when displaying a stereoscopic image, and the relationship of the row pixels Pr is more important when displaying a 2-D image.

In an exemplary embodiment of the present invention, the mosaic arrangement includes the column pixels Pc in which pixels refracted in the same direction are grouped to represent one color when displaying a stereoscopic image, to eliminate the effect of one color being recognized according to the position of the eye, thereby improving the display quality of the stereoscopic image.

However, even though the pixels have a mosaic arrangement, a 2-D image is refracted through the lenticular lens 410 and perceived with decreased visibility of thin lines or small characters.

To substantially reduce this effect, according to an embodiment of the present invention, when displaying a 2-D image, data applied to each subpixel is filtered by using data of surrounding subpixels.

In another exemplary embodiment of the present invention, one lenticular lens 410 is formed for a total of twelve subpixels. Here, a subpixel is a unit representing either red, green, blue, or white, and a pixel is a combination of four subpixels representing red, green, blue, and white. That is, one lenticular lens 410 is formed for a total of twelve subpixels, corresponding to four pixels. A present exemplary embodiment for the case in which one lenticular lens 410 is formed for nine subpixels (three pixels) as described in the exemplary embodiment of FIG. 2, is essentially the same as the case in which one lenticular lens 410 is formed for twelve subpixels (four pixels), such that a detailed description of an exemplary embodiment for twelve subpixels is omitted.

Next, the filtering of 2-D image data will be described with reference to FIG. 3 to FIG. 8.

First, the structure of a stereoscopic image display device according to an exemplary embodiment of the present invention will be described with reference to the circuit shown in FIG. 3.

Figure 3:
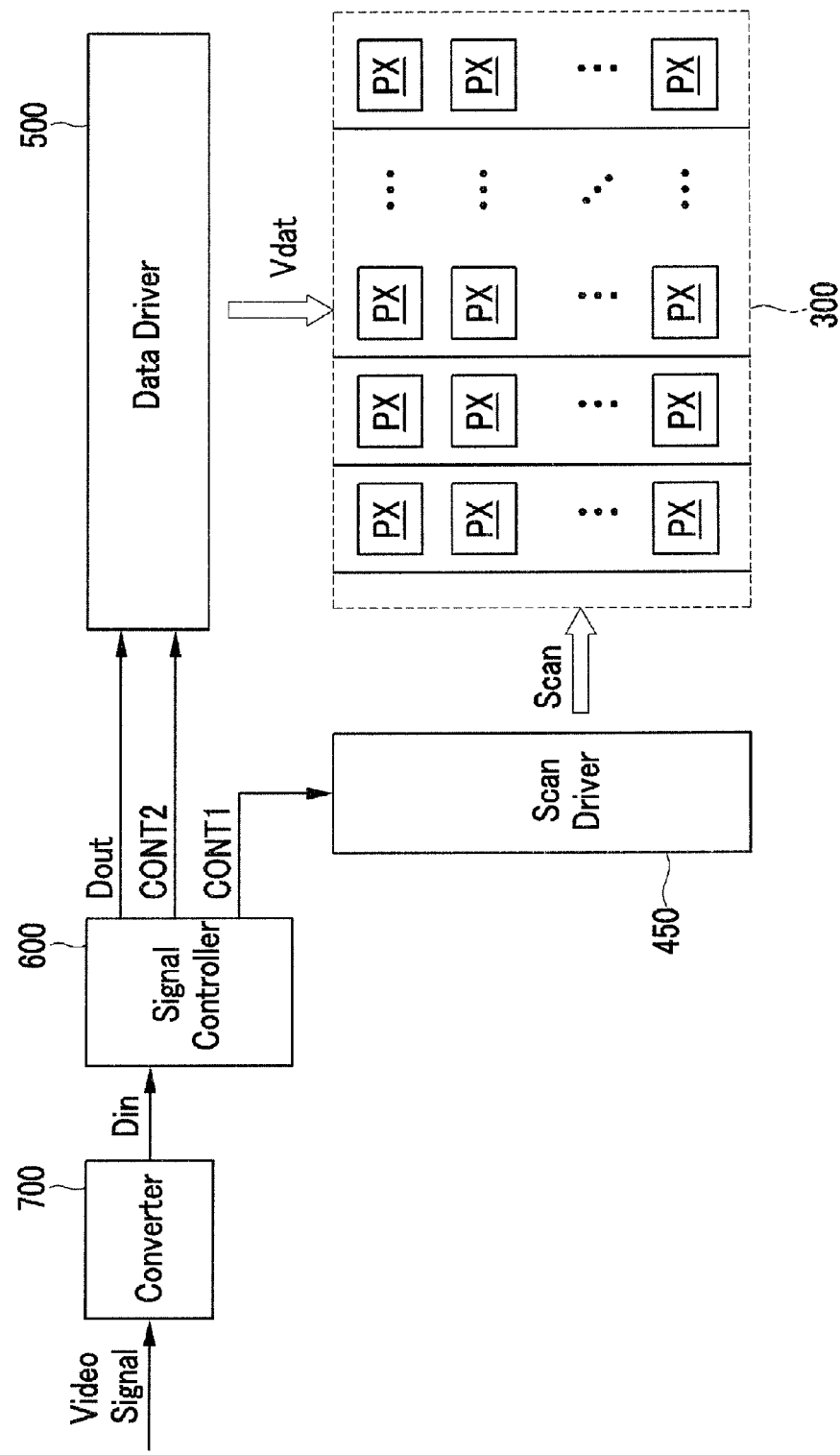
FIG. 3 is a block diagram of a stereoscopic image display device according to an exemplary embodiment of the present invention.

FIG. 3 is a block diagram of a stereoscopic image display device according to an exemplary embodiment of the present invention.

As shown in FIG. 3, a stereoscopic image display device according to an exemplary embodiment of the present invention includes a display panel 300, a scan driver 400, a data driver 500, a signal controller 600, and a converter 700. A lenticular unit 400 is formed on the display panel 300 of FIG. 3, however FIG. 3 is a simple block diagram such that the structure of the lenticular lens is not shown.

The display panel 300 includes gate lines (not shown) transmitting a scanning signal, data lines (not shown) transmitting a data voltage, and a plurality of pixels PX connected thereto and arranged in an approximate matrix form. Each pixel PX of FIG. 3 includes three subpixels (red, green, and blue subpixels), as in FIG. 2. Alternatively, each pixel PX of FIG. 3 may include four subpixels (red, green, blue, and white subpixels).

The gate lines extend substantially in a row direction parallel to each other, and the data lines extend substantially in a column direction parallel to each other.

Each subpixel included in one pixel PX includes a thin film transistor connected to a gate line and a data line, a pixel electrode connected to a thin film transistor, a common electrode facing the pixel electrode, and a liquid crystal layer disposed between the pixel electrode and the common electrode.

The scan driver 400 is connected to the gate lines of the display panel 300, and applies a gate voltage made of a combination of a gate-on voltage Von and a gate-off voltage Voff to the gate lines.

The data driver 500 is connected to the data line of the display panel 300, and applies the data voltage representing an image signal to the data lines. Here, the image signal may be either a stereoscopic image signal to display a stereoscopic image or a plane image signal to display a 2-D image.

The signal controller 600 controls the operation of the scan driver 400 and the data driver 500 via the CONT1 and CONT2 signals, respectively, and processes an input image signal Din to transmit an output image signal Dout to the data driver 500.

Figure 4:
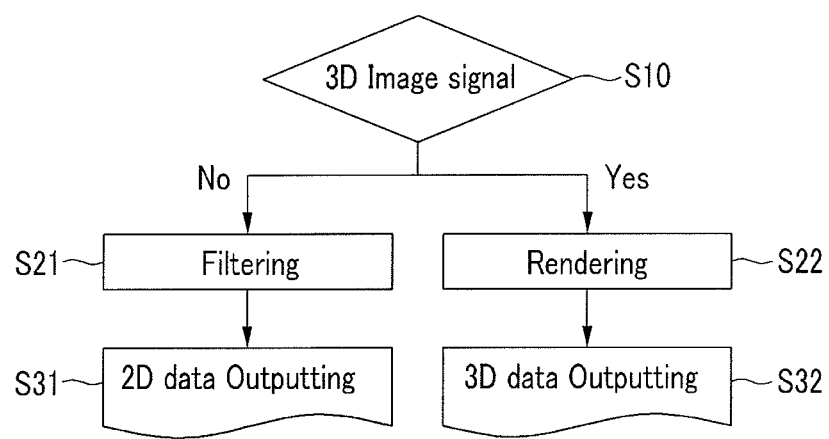
FIG. 4 is a flowchart showing a method of processing image data in a stereoscopic image display device according to an exemplary embodiment of the present invention.

The input image signal Din input to the signal controller 600 is an output signal of the converter 700, and the converter 700 processes the image signal (video signal) received from an external device as in FIG. 4 and transmits the processed signal to the signal controller 600.

Hereinafter, processing of the image signal input from the external device according to an exemplary embodiment of the present invention will be described with reference to FIG. 4.

FIG. 4 is a flowchart showing a method of processing image data of a stereoscopic image display device according to an exemplary embodiment of the present invention.

First, it is determined whether the image signal (the video signal) input received from an external source is a signal to display a stereoscopic image, hereinafter referred to as a 3-D image signal, or a signal to display a 2-D image, hereinafter referred to as a 2-D image signal (S10).

Generally, the 3-D image signal includes data for depth in addition to the 2-D image signal. That is, the 3-D image signal has depth data added to the 2-D image for the image to be recognized as a stereoscopic image, and if there is depth data, the data is render-processed to generate 3-D data as stereoscopic image data (S22) that is then transmitted to the signal controller 600 (S32).

On the other hand, if there is no depth data, a 2-D image is displayed, and the input image signal (the video signal) is filter-processed (S21) to generate 2-D data as 2-D image data that is then transmitted to the signal controller 600 (S31).

First, referring to S10, the 3-D image signal and the 2-D image signal are distinguished with reference to the existence of the depth data, however they may be distinguished with reference to different data in other exemplary embodiments.

A case in which the image signal is determined to be a 3-D image signal in the first step (S10) will be described first.

If a 3-D image signal is recognized, the depth data added to the 2-D image signal must be processed. Various processing methods may be used, but in a present exemplary, non-limiting, embodiment, the depth data is render-processed (S22) to generate the 3-D data.

During render-processing (S22), a plurality of identical screens are displayed to be recognized as stereoscopic. As one example, when displaying a stereoscopic image in a display panel having a resolution of 1920×1080, the stereoscopic perception is provided through a method in which nine overlaps of a 640×360 screen are displayed. That is, nine pixels shown in FIG. 2 all display the same data, and nine subpixels representing red among twenty-seven subpixels all display the same data, nine subpixels representing blue all display the same data, and nine subpixels representing green all display the same data. Through this display, all 1920×1080 pixels may be supplied with data, and stereoscopic perception may be realized when the image signal is transmitted in different directions to the eyes due to the lenticular lens 410. Here, one pixel is recognized from column pixels Pc, shown in FIG. 2, that are refracted in the same direction.

In a present exemplary embodiment, the render-processed data is output to the signal controller 600 as 3-D data (S32).

A case in which the image signal is determined to be a 2-D image signal in the step S10 will now be described.

If a 2-D image signal is recognized, the input image video signal is filtered (S21) and output to the signal controller 600, and this is described with reference to FIG. 5 and FIG. 6.

Figure 5:
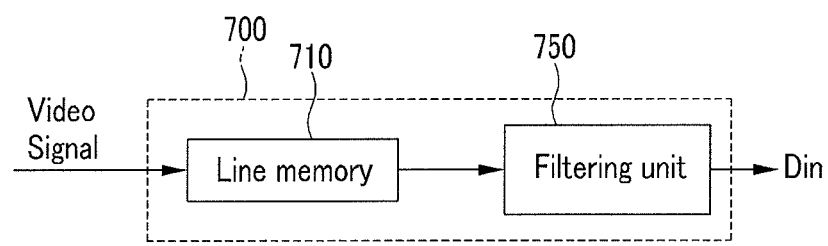
FIG. 5 is a block diagram of a portion of the converter of FIG. 3 in detail.
Figure 6:
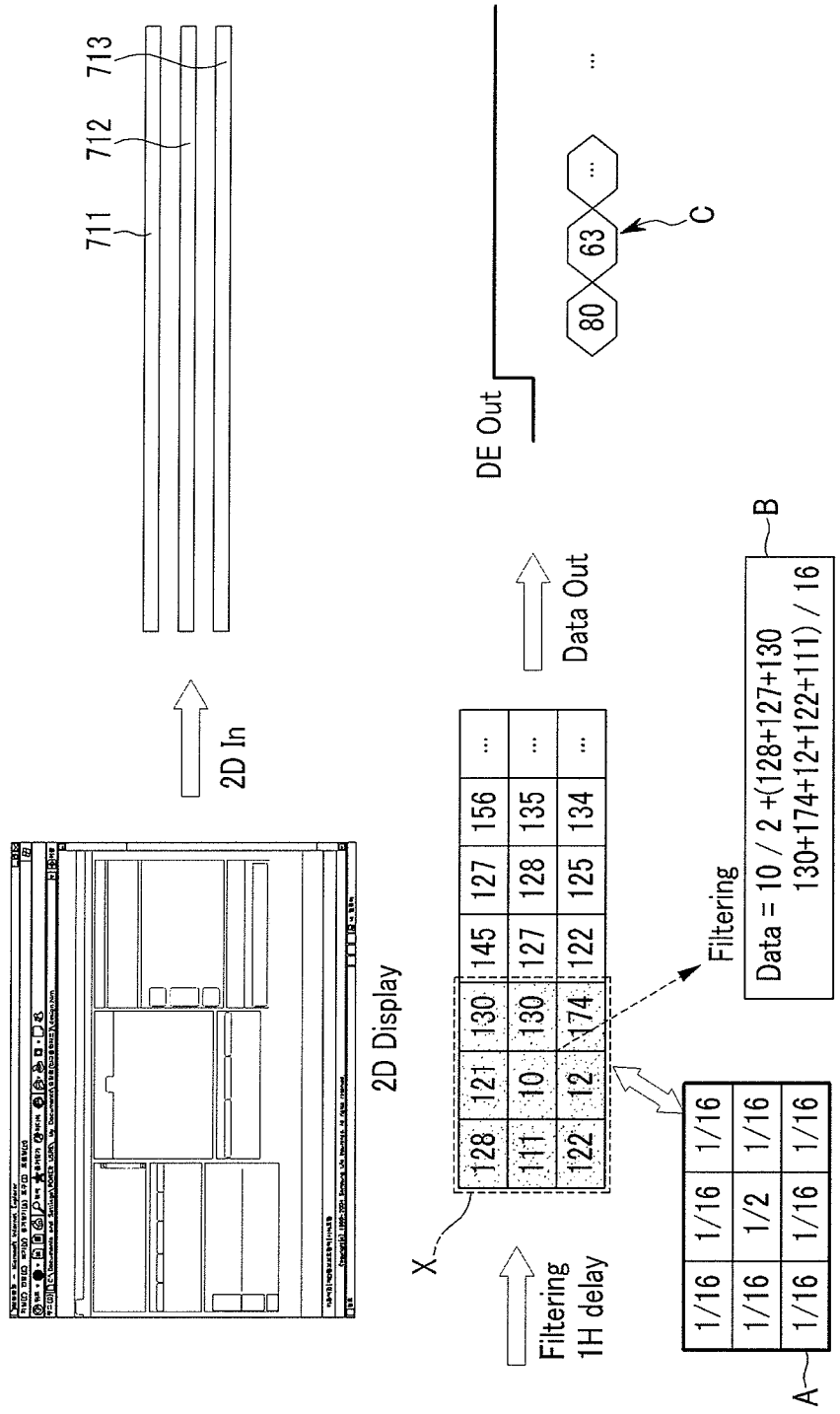
FIG. 6 illustrates the display of a 2-D image in the method of FIG. 4 in detail.

FIG. 5 is a block diagram of a portion of a converter of FIG. 3 in detail, and FIG. 6 illustrates the display of a 2-D image in a method of FIG. 4 in detail.

First, a block diagram of the converter 700 will be described with reference to FIG. 5. FIG. 5 shows a converter 700 configured for filtering the 2-D image signal, which includes a line memory 710 and a filtering unit 750. Therefore, when recognizing the signal as a 3-D image signal, the data may be processed through a structure different from that of FIG. 5, with the filtering unit 750 determining the signal to be a 3-D image signal (S10) and render-processing (S22) the 3-D image signal.

As shown in FIG. 5, an image video signal received from an external device is input to the line memory 710. The size of the line memory 710 is sufficient to store data for displaying at least one row of an image of the display panel 300.

On the other hand, as shown in an exemplary embodiment of FIG. 6, the line memory 710 may include first to third line memories 711, 712, and 713. In an exemplary embodiment of FIG. 6, the data is stored as follows.

First, the image video signal is received and stored to the first line memory 711. The size of the first line memory 711 is sufficient to store the data for displaying one row image of the display panel 300, and the size of the second and third line memories 712 and 713 is the same. However, the size of each of the line memories 711, 712, and 713 may vary according to other embodiments of the invention.

After data to display one row of the input image video signal is stored to the first line memory 711, the data stored to the first line memory 711 is moved to the second line memory 712, and the next data is stored to the first line memory 711. Again, if data for displaying one row is stored to the first line memory 711, the data stored to the first line memory 711 and the second line memory 712 are respectively moved to the second line memory 712 and the third line memory 713. The next data is again stored to the first line memory 711. The data that was stored to the third line memory 713 is overwritten and erased when the data stored to the second line memory 712 is moved thereto.

In this way, the data stored to the first to third line memories 711, 712, and 713 is transmitted to the filtering unit 750 to be filter-processed (S21).

Filter-processing uses eight subpixels having the same color and that enclose the remaining one subpixel in the corresponding central pixel, as shown in FIG. 6.

As shown in FIG. 6, if the image video signal for a 2-D image is received, the data is sequentially stored to the first to third line memories 711, 712, and 713. Referring to section B, the stored data is filter-processed using a 3×3 filter A after a predetermined time (1H in FIG. 6) with respect to the overlapped region X, and the result thereof is output, shown in section C.

That is, the input data of three rows sequentially overlap the filter A, shown as the region X, and are calculated as shown in section B, and then the result thereof is determined and output as the data value C positioned at the central portion of the overlapped region (the region X).

The data calculation method described for section B is to respectively multiply the corresponding numbers and accumulate them in the region X overlapping the filter A. That is, the multiplication of the values is started at the left upper sides with 128×1/16 in the 3×3 filter A and the 3×3 region X, and is continued by row from the left to the right with 121×1/16, 130×1/16, 111×1/16, 10×1/2, 130×1/16, 122×1/16, 12×1/16, and 174×1/16. The value 63 is the sum of the products, and is output as a value corresponding to the data value of 10 positioned at the central part of the region X, shown in section C.

Next, the region X is moved by one column and the data are again filtered through the calculating method.

On the other hand, a case where there is no corresponding data in the region X overlapping the filter A may be generated. That is, when there is no corresponding data for filtering the top/bottom/left/right outer portions of the display panel 300, the corresponding output data is 0.

The converter 700 shown in FIG. 5 may be configured on a programmable IC chip that supports addition and the subtraction, and in which multiplication and the division may be implemented by further bit data processing. For example, in the case of an 8-bit data word, the multiplication result may be obtained by using the upper 7 bits to multiply by 1/2, the upper 4 bits to multiply by 1/16, and the upper 5 bits to multiply by 1/8, to obtain the multiplication result. An additional calculator is not necessary to obtain the result that may be otherwise be obtained by appropriately adding or subtracting.

Each data of the region X shown in FIG. 6 is data corresponding to one color among red, green, and blue. That is, the data stored to the line memories 711, 712 and 713 are classified and divided into data of each color, the data of each color is arranged as shown in FIG. 6, and the arranged data overlaps the filter A for filtering.

Next, if the output data for each color is determined, the output data is output like the arrangement of the subpixels of FIG. 2. The converter 700 arranges the data, which may be processed by the signal controller 600.

As described above, if filtering is executed using the filter A, the data of the corresponding subpixel (or the corresponding pixel) is influenced by the surrounding subpixels (or pixels) as illustrated in the calculation B. As a result, the number of pixels displaying a thin longitudinal line or small character may be increased such that a region refracted through the lens is widened to be more easily perceived.

FIG. 6 shows an example of filter-processing. As shown in FIG. 6, the filter A uses half of the data value corresponding to a specific pixel, and 1/16 of the data values corresponding to the eight surrounding pixels.

However, a filter of a different structure from the filter A of FIG. 6 may be included according to other exemplary embodiments. In one exemplary embodiment, the nine weight values in a 3×3 filter may have values different from each other. On the other hand, in another exemplary embodiment, the 3×3 filter may have a symmetrical structure such as that described with reference to FIG. 7 and FIG. 8.

FIG. 7 and FIG. 8 depict examples of filters for processing a 2-D image according to other exemplary embodiments of the present invention.

A filter of an exemplary embodiment of FIG. 7 has the same structure as the filter A of FIG. 6. That is, the weight value of the central part is different from that of FIG. 6, and the surrounding eight weight values are the same. Like the filter A of FIG. 6, the value α may be larger than the value β.

On the other hand, in FIG. 8, the center top, center bottom, center left, and center right weight values are the same, the central weight value β is unique, and the remaining weight values γ in the corners are the same. Here, according to exemplary embodiments, the value α may be larger than the value β and the value β may be smaller than the value γ.

The sum of the weight values of FIG. 7 and FIG. 8 according to a present exemplary embodiment is 1. Other exemplary embodiments having various weight values different from FIG. 7 and FIG. 8 may be provided.

According to another embodiment of the invention, a method may be used in which a YCbCr color space is used when processing the image data. In this method, the data is processed with reference to Y representing the luminance and Cb and Cr representing the chrominance. The filtering described in FIG. 6 may executed as for red, green, and blue in the RGB color space. That is, processing the data in the YCbCr color space does not require the data conversion into the RGB color space, which improves processing speed and processing performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A stereoscopic image display device comprising:
a display panel including pixels having subpixels representing at least three different colors and arranged in a matrix form;
a lenticular lens disposed on the display panel;
a data driver applying a data voltage to the display panel;
a signal controller controlling the data driver; and
a converter that filters an image signal representing a 2-D image signal received from an external source to generate and transmit output data to the signal controller,
wherein the converter includes a line memory for storing the image signals for one row of the image signals, and a filtering unit for filtering the image signals stored in the line memory, and
wherein the lenticular lens has a semi-circular cylinder shape and is aligned to transmit light from at least one row pixel of the display panel,
the filtering uses a 3×3 square matrix of weight values,
the filter is applied to image signals sequentially stored to the line memory wherein the output data is generated by multiplying the corresponding image signal by the weight values of the square matrix and accumulating the multiplied values, and
the central weight value of the square matrix is the largest, and the surrounding weight values are the same, and the filtering is processed for subpixels representing the same color.

2. The stereoscopic image display device of claim 1, wherein the lenticular lens is aligned to transmit light from three row pixels of the display panel.

3. The stereoscopic image display device of claim 2, wherein the subpixels corresponding to the lenticular lens include subpixels representing at least three different colors which form a column.

4. The stereoscopic image display device of claim 3, wherein
the subpixels corresponding to the lenticular lens are grouped in a same row or a same column to define a column pixel or a row pixel, and wherein the column or the row includes a first pixel having a sequence of red, green, and blue subpixels, a second pixel having a sequence of green, blue, and red subpixels, and a third pixel having a sequence of blue, red, and green subpixels.

5. The stereoscopic image display device of claim 1, wherein the converter is formed of a programmable integrated circuit (IC) chip.

6. The stereoscopic image display device of claim 1, wherein the filtering includes in the output data the image signal corresponding to pixels surrounding a specific pixel weighted according to their position relative to the specific pixel.

7. The stereoscopic image display device of claim 6, wherein the filtering processes eight pixels surrounding the specific pixel.

8. The stereoscopic image display device of claim 7, wherein the filtering processes subpixels representing the same color in the specific pixel and the surrounding pixels.

9. The stereoscopic image display device of claim 1, wherein the converter render-processes an image signals representing a 3-D stereoscopic images received from the external source.

10. The stereoscopic image display device of claim 1, further comprising:
a protecting substrate formed between the display panel and the lenticular lens; and
a protecting film disposed at the surface of the lenticular lens.

11. A method for displaying an image of a stereoscopic image display device that uses a lenticular lens, comprising:
determining whether an input image signal received from an external source is an image signal representing a 2-D image or an image signal representing a stereoscopic image;
filtering the input image signal to generate output data when the input image signal is an image signal representing a 2-D image; and
outputting the output data to display an image,
wherein the filtering uses a 3×3 square matrix of weight values,
the filter is applied to image signals sequentially stored to the line memory wherein the output data is generated by multiplying the corresponding image signal by the weight values of the square matrix and accumulating the multiplied values,
the central weight value of the square matrix is the largest, and the surrounding weight values are the same, and
the filtering is processed for subpixels representing the same color.

12. The method of claim 11, wherein the filtering processes subpixels representing the same color in the specific pixel and the surrounding pixels.

13. The method of claim 12, wherein the sum of the weight values of the specific pixel and the surrounding pixels is 1.

14. The method of claim 11, wherein the filtering processes eight pixels surrounding the specific pixel.

15. A stereoscopic image display device comprising:
a display panel including pixels having subpixels representing at least three different colors and arranged in a matrix form; and
a converter that filters an image signal representing a 2-D image signal received from an external source to generate output data and to transmit it to the signal controller, wherein the converter includes a line memory for storing the image signal for one row of the image signals, and a filtering unit for filtering the image signal stored in the line memory;
wherein the filtering uses a 3×3 square matrix of weight values and the filter is applied to the image signal sequentially stored to the line memory wherein the output data is generated by multiplying the corresponding image signal by the weight values of the square matrix and accumulating the multiplied values, and
the central weight value of the square matrix is the largest, and the surrounding weight values are the same, and
the filtering is processed for subpixels representing the same color.

16. The stereoscopic image display device of claim 15, further comprising a lenticular lens disposed on the display panel, wherein the lenticular lens has a semi-circular cylinder shape and is aligned to transmit light from three rows of three pixels of the display panel,
wherein the subpixels corresponding to the lenticular lens are grouped in a same row or a same column to define a column pixel or a row pixel, and wherein the column or the row includes a first pixel having a sequence of red, green, and blue subpixels, a second pixel having a sequence of green, blue, and red subpixels, and a third pixel having a sequence of blue, red, and green subpixels.

17. A stereoscopic image display device comprising:
a display panel including pixels having subpixels representing at least three different colors and arranged in a matrix form;
a lenticular lens disposed on the display panel;
a data driver applying a data voltage to the display panel;
signal controller controlling the data driver; and
a converter that filters an image signal representing a 2-D image signal received from an external source to generate and transmit output data to the signal controller, wherein:
the converter includes a line memory for storing the image signals for one row of the image signals, and a filtering unit for filtering the image signals stored in the line memory,
the lenticular lens has a semi-circular cylinder shape and is aligned to transmit light from at least one row pixel of the display panel,
the filtering uses a 3×3 square matrix of weight values,
the filter is applied to image signals sequentially stored to the line memory wherein the output data is generated by multiplying the corresponding image signal by the weight values of the square matrix and accumulating the multiplied values,
the central weight value of the square matrix is the largest, and the center top, center bottom, center right, and center left weight values are the same and are different from the weight values of the upper left corner, upper right corner, lower left corner, and lower right corner that are the same, and
the filtering is processed for subpixels representing the same color.

18. The stereoscopic image display device of claim 17, wherein the lenticular lens is aligned to transmit light from three row pixels of the display panel.

19. The stereoscopic image display device of claim 18, wherein the subpixels corresponding to the lenticular lens include subpixels representing at least three different colors which form a column.

20. The stereoscopic image display device of claim 19, wherein
the subpixels corresponding to the lenticular lens are grouped in a same row or a same column to define a column pixel or a row pixel, and wherein the column or the row includes a first pixel having a sequence of red, green, and blue subpixels, a second pixel having a sequence of green, blue, and red subpixels, and a third pixel having a sequence of blue, red, and green subpixels.

21. The stereoscopic image display device of claim 17, wherein the converter is formed of a programmable integrated circuit (IC) chip.

22. The stereoscopic image display device of claim 17, wherein the filtering includes in the output data the image signals corresponding to pixels surrounding a specific pixel weighted according to their position relative to the specific pixel.

23. The stereoscopic image display device of claim 22, wherein the filtering processes eight pixels surrounding the specific pixel.

24. The stereoscopic image display device of claim 23, wherein the filtering processes subpixels representing the same color in the specific pixel and the surrounding pixels.

25. The stereoscopic image display device of claim 17, wherein the converter render-processes an image signals representing a 3-D stereoscopic image received from the external source.

26. The stereoscopic image display device of claim 17, further comprising:
   a protecting substrate formed between the display panel and the lenticular lens; and
   a protecting film disposed at the surface of the lenticular lens.

27. A method for displaying an image of a stereoscopic image display device that uses a lenticular lens, comprising;
   determining whether an input image signal received from an external source is an image signal representing a 2-D image or an image signal representing a stereoscopic image;
   filtering the input image signal to generate output data when the input image signal is an image signal representing a 2-D image; and
   outputting the output data to display an image, wherein:
   the filtering uses a 3×3 square matrix of weight values,
   the filter is applied to image signals sequentially stored to the line memory wherein the output data is generated by multiplying the corresponding image signal by the weight values of the square matrix and accumulating the multiplied values,
   the central weight value of the square matrix is the largest, and the center top, center bottom, center right, and center left weight values are the same and are different from the weight values of the upper left corner, upper right corner, lower left corner, and lower right corner that are the same, and
   the filtering is processed for subpixels representing the same color.

28. The method of claim 27, wherein the filtering processes subpixels representing the same color in the specific pixel and the surrounding pixels.

29. The method of claim 28, wherein the sum of the weight values of the specific pixel and the surrounding pixels is 1.

30. The method of claim 27, wherein the filtering processes eight pixels surrounding the specific pixel.

31. A stereoscopic image display device comprising:
   a display panel including pixels having subpixels representing at least three different colors and arranged in a matrix form; and
   a converter that filters an image signal representing a 2-D image signal received from an external source to generate output data and to transmit it to the signal controller,
   wherein the converter includes a line memory for storing the image signal for one row of the image signals, and a filtering unit for filtering the image signal stored in the line memory;
   wherein the filtering uses a 3×3 square matrix of weight values and the filter is applied to the image signal sequentially stored to the line memory wherein the output data is generated by multiplying the corresponding image signal by the weight values of the square matrix and accumulating the multiplied values,
   wherein the central weight value of the square matrix is the largest, and the center top, center bottom, center right, and center left weight values are the same and are different from the weight values of the upper left corner, upper right corner, lower left corner, and lower right corner that are the same, and
   the filtering is processed for subpixels representing the same color.

32. The stereoscopic image display device of claim 31, further comprising a lenticular lens disposed on the display panel,
   wherein the lenticular lens has a semi-circular cylinder shape and is aligned to transmit light from three rows of three pixels of the display panel,
   wherein the subpixels corresponding to the lenticular lens are grouped in a same row or a same column to define a column pixel or a row pixel, and wherein the column or the row includes a first pixel having a sequence of red, green, and blue subpixels, a second pixel having a sequence of green, blue, and red subpixels, and a third pixel having a sequence of blue, red, and green subpixels.

* * * * *